United States Patent
Ogatsu

(10) Patent No.: US 7,145,642 B2
(45) Date of Patent: Dec. 5, 2006

(54) WAFER SUPPORT DEVICE AND A WAFER SUPPORT METHOD

(75) Inventor: Toshinobu Ogatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 121 days.

(21) Appl. No.: 10/694,841

(22) Filed: Oct. 29, 2003

(65) Prior Publication Data

US 2004/0084824 A1 May 6, 2004

(30) Foreign Application Priority Data

Oct. 29, 2002 (JP) ............................. 2002-315097

(51) Int. Cl.
*G03B 27/58* (2006.01)
*G03B 27/60* (2006.01)

(52) U.S. Cl. .......................................... 355/72; 355/73

(58) Field of Classification Search .................. 355/72, 355/73, 75, 76, 77

See application file for complete search history.

(56) References Cited

U.S. PATENT DOCUMENTS

| | | | | |
|---|---|---|---|---|
| 5,685,232 | A * | 11/1997 | Inoue ........................... | 108/20 |
| 6,036,162 | A * | 3/2000 | Hayashi ........................ | 248/550 |
| 6,226,075 | B1 * | 5/2001 | Loopstra et al. .............. | 355/76 |
| 6,266,133 | B1 * | 7/2001 | Miyajima et al. ............. | 355/72 |
| 6,445,440 | B1 * | 9/2002 | Bisschops et al. ............ | 355/53 |
| 6,473,159 | B1 * | 10/2002 | Wakui et al. .................. | 355/53 |
| 6,473,161 | B1 * | 10/2002 | Cuijpers et al. .............. | 355/53 |
| 6,597,429 | B1 * | 7/2003 | Janssen et al. ................ | 355/53 |
| 6,597,433 | B1 * | 7/2003 | Renkens et al. .............. | 355/75 |
| 6,731,372 | B1 * | 5/2004 | Binnard et al. ............... | 355/53 |
| 6,894,449 | B1 * | 5/2005 | Nishi ........................... | 318/114 |
| 2005/0012920 | A1 * | 1/2005 | Jeanne et al. ................. | 355/72 |

FOREIGN PATENT DOCUMENTS

| | | |
|---|---|---|
| JP | 9-22927 A | 1/1997 |
| JP | 3267938 A | 1/2002 |
| JP | 2002-100666 A | 4/2002 |

* cited by examiner

*Primary Examiner*—Rodney Fuller
(74) *Attorney, Agent, or Firm*—Sughrue Mion, PLLC

(57) ABSTRACT

A wafer support device having a fixed base, a guiding device, a movable base disposed so as to move in a vertical direction with respect to the fixed base by the guiding device, a first pressing device pressing the movable base, a θ stage rotatably disposed on the movable base with the vertical direction as a rotation axis, a linear motor, a contact bar, a load control device controlling a load of pressing, and a controller controlling a pressing force by the first pressing device based on the load. The first pressing device has a cylinder and a main pressurizing chamber and a sub-pressurizing chamber, a piston rod vertically moving in the main pressurizing chamber and the sub-pressurizing chamber, respectively, a main pressure controller controlling a pressure in the main pressurizing chamber, and a sub pressure controller controlling a pressure in the sub-pressurizing chamber.

28 Claims, 9 Drawing Sheets

1 : ADSORPTION STAGE
7 : PRESSING MEMBER

WAFER SUPPORT DEVICE AND A WAFER SUPPORT METHOD

BACKGROUND OF THE INVENTION

1. Field of the Invention

The present invention relates to a wafer support device and a wafer support method and more particularly, to a wafer support device and a wafer support method with high-accuracy positioning and pressure control in an apparatus for performing an electrical characteristic test of a chip or the like on a semiconductor wafer.

2. Description of Related Arts

In general, an apparatus for an electrical characteristic test, performs the test by bringing a probe in contact with the electrode of each chip on a wafer, refereed to as a prober. As Japanese Published Application H9-22927A disclosed, the positioning of the probe and the prober is used a base for moving the wafer in the X, Y, Z, or θ direction and performed by image processing or the like to bring the probe in contact with each chip. In the case of the mechanism, for the Z direction in association with the contact pressure of the probe, after setting at the time of the initial calibration, control is performed by only the position in the Z direction not depending upon the contact pressure.

Recently, according to the reduction in pitch of a semiconductor chip to be targeted for test proceeds, a size and a thickness of a probe for use in the test also has been reduced. However, the contact load for establishing an electrical connection is also required to some degrees, therefore, it is not possible to ascertain the contact state of the probe with precision only with positioning by the positional control as in the prior art. Under such circumstances, Japanese published application 2002-100666A discloses a lifting device for a stage which comprises a correction table corresponding to the magnitude of the load applied on the stage and the positional deviation amounts in the X axis direction and the Y axis direction of the stage. Further, Japanese Patent 3267938B discloses a prober for reducing the moment generating when a probe brought in contact with a wafer applies the stage with pressure, by using a plurality of actuators on a plurality of sites of a stage.

However, with the increase in diameter of a wafer, and a further reduction in pitch, the positioning is required to be more precise.

SUMMARY OF THE INVENTION

The present invention provides a wafer support device and a wafer support method which performs precise positioning on a semiconductor wafer.

According to a first aspect of the present invention, a wafer support device comprises a fixed base, a guiding device on the fixed base, a movable base disposed movably vertically with respect to the fixed base by the guiding device, a first pressing device fixed on the fixed base, the first pressing device pressing the movable base, a θ stage rotatably disposed on the movable base with the vertical direction as a rotation axis, a linear motor fixed on the fixed base, a contact bar disposed on the movable base, a load control device controlling a load of pressing, and a controller controlling a pressing force by the pressing device based on the load detected by the load sensor, wherein the first pressing device has a cylinder which is fixed on the fixed base and has a main pressurizing chamber and a sub-pressurizing chamber, a piston rod vertically moving in the main pressurizing chamber and the sub-pressurizing chamber, respectively, a main pressure controller controlling a pressure in the main pressurizing chamber, and a sub pressure controller controlling a pressure in the sub-pressurizing chamber.

According to a second aspect of the present invention, a wafer support method comprises providing a movable base having a stage loading a wafer, providing compressed air into a main pressurizing chamber or a sub-pressurizing chamber, moving the movable base by the compressed air in the main pressurizing chamber or a sub-pressurizing chamber, moving the movable base by cross roller guide on a fixed base, detecting a position of the movable base, controlling the position of the movable base according to the position detected.

DETAILED DESCRIPTION OF THE INVENTION (First Embodiment)

Figure 1:
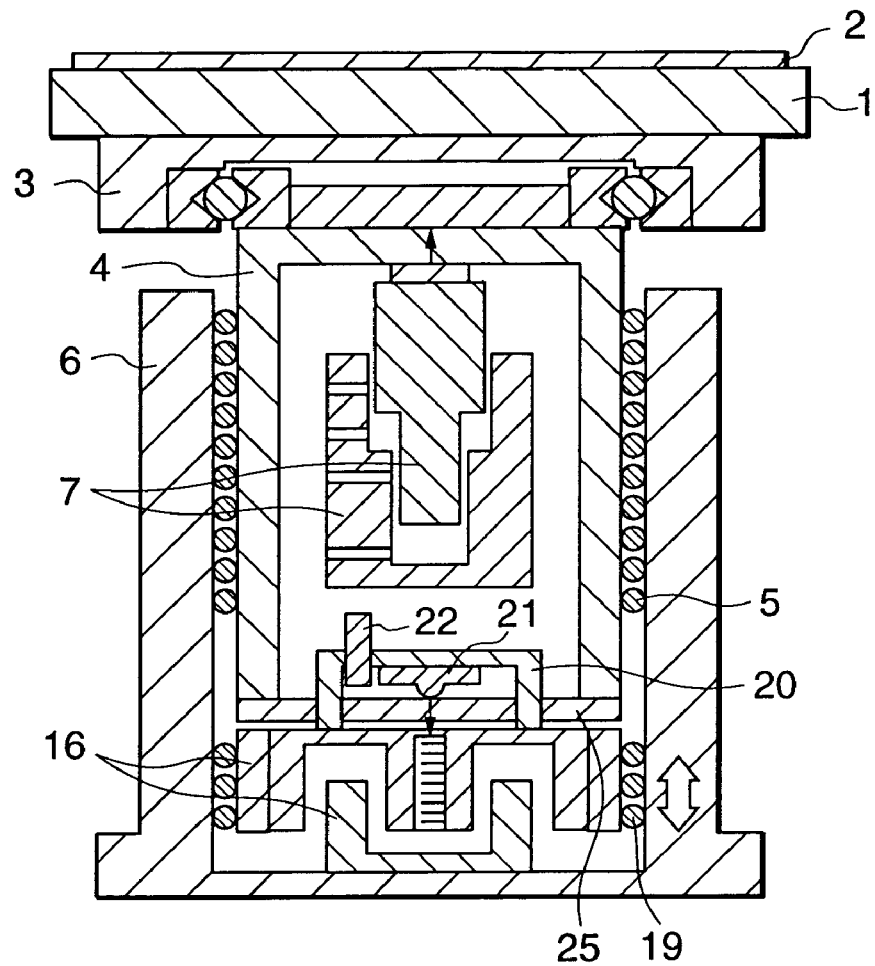
FIG. 1 is a cross sectional view of a first embodiment of the present invention.
Figure 1:
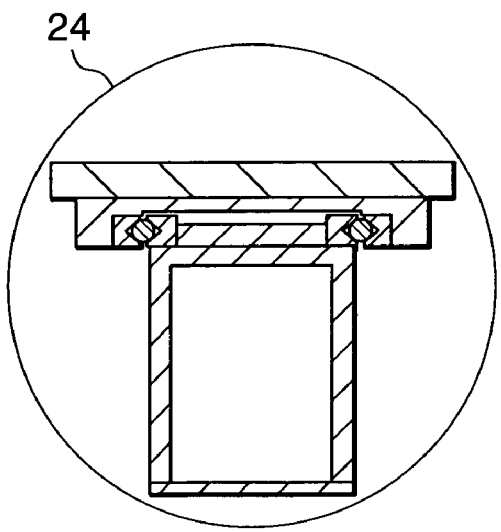

FIG. 1 is a cross sectional view showing a first embodiment of the present invention. In a wafer support device of the first embodiment of the present invention, a movable base 4 is guided vertically with respect to a fixed base 6 by a high-rigidity large cross roller guide 5. Further, a pressing member 7 for pressing the movable base 4 is disposed in the fixed base 6. To the movable base 4, a contact bar 25 is fixed, and on the movable base 4, a θ stage 3 is disposed. The θ stage 3 is driven by an external motor (not shown), or manually, and the protrusion disposed on the outer periphery portion is pushed and pulled by a precision screw. This allows the precise control of the angle in the direction of rotation. On the θ stage 3, an adsorption stage 1 made of a porous material is fixed, and the adsorption stage fixes samples of various sizes by vacuum suction. On the adsorption stage 1, a work to be tested such as a wafer 2 or a single-piece chip is mounted. Further, on the fixed base 6, a linear motor 16 which is a driving member of a sensor housing 20 is disposed. On the sensor housing 20, a load sensor 21 and a high-precision displacement sensor 22 are disposed. A Z unit 24 composed of the movable base 4, the contact bar 25, the θ stage 3, and the adsorption stage 1 is supported by the pressing member 7, and is disposed so that the contact bar 25 is in contact with the load sensor 21.

Figure 2:
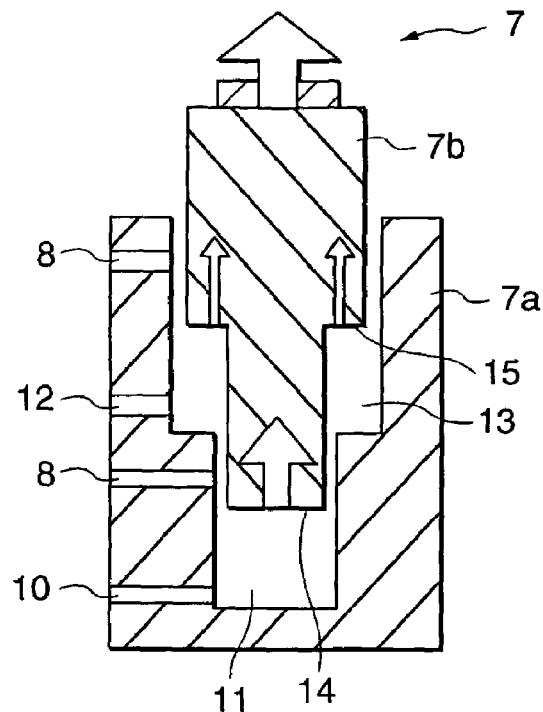
FIG. 2 is a cross sectional view of a pressing member in the first embodiment of the present invention.

FIG. 2 is a cross sectional view of the pressing member 7 of this embodiment. The pressing member 7 of this embodiment is composed of a cylinder 7a and a rod 7b. The cylinder 7a is fixed on the fixed base 6. The rod 7b enters thereinto and recedes therefrom, which causes the Z unit 24 to move up and down. The cylinder 7a is provided with compressed air ports for air bearing 8, a main pressurizing chamber compressed air port 10, and a sub-pressurizing chamber compressed air port 12. In this embodiment, a compressed air is fed from the compressed air ports for air bearing 8 at two positions, so that the rod 7b at the center is in non-contact with the cylinder 7a. Further, a compressed air is fed from the main pressurizing chamber compressed air port 10 to a main pressurizing chamber 11, and further from the sub-pressurizing chamber compressed air port 12 to a sub-pressurizing chamber, respectively. As a result, the operating force is transmitted to a main pressurizing chamber pressure-receiving side 14 and a sub-pressurizing chamber pressure receiving side 15 at the bottom end of the rod 7b. The presence of the pressurizing chambers at two positions in the pressing member 7 is for dividing the pressure-receiving area into two different areas, and thereby facilitating the precise pressure control. For example, in the main pressurizing chamber 11 which has a pressure-receiving area of as large as 314.3 mm², and is capable of exhibiting a thrust of about 63 N at a maximum pressurizing force of 0.2 MPa, the self weight of the heavy materials constituting the Z unit 24 is cancelled. Whereas, in the sub-pressurizing chamber 13 which has a pressure-receiving area of 20 mm², and produces a thrust of about 5 N at a maximum pressurizing force of 0.25 MPa, the fine contact load is controlled. The sub-pressurizing chamber 13 performs pressure control using a precision electropneumatic regulator for a pressure controller in order to facilitate the external pressure setting. In the wafer support device of this embodiment, a compressed air is fed into the pressurizing chamber of the pressing member 7, so that the rod 7b is applied with an upward force, which has a function of pushing up the Z unit 24 from under to above.

Figure 3:
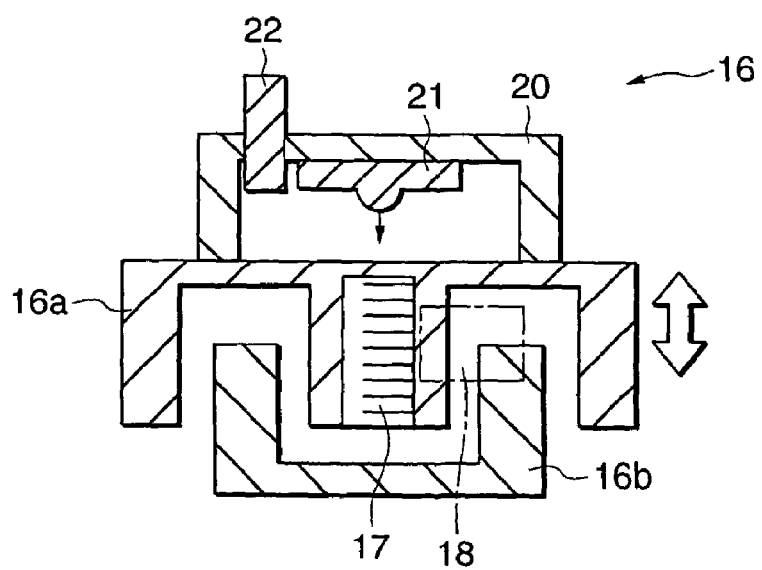
FIG. 3 is a cross sectional view of a linear motor in the first embodiment of the present invention.

On the other hand, FIG. 3 is a cross sectional view of the linear motor 16 of this embodiment. The linear motor 16 is composed of a movable magnet 16a and a fixed coil 16b. The fixed coil 16a is fixed on the fixed base 6 by a linear motion guide 19, and the movable magnet 16a is guided vertically with respect to the fixed base 6. To the movable magnet 16a, a linear scale 17 is mounted, so that position detection is carried out by means of a scale reading head 18 attached on the fixed base 4 to perform servo control by position feedback. Further, to the movable magnet 16a, the sensor housing 20 including the load sensor 21, and the high-precision displacement sensor 22 for measuring the sinking amount of the load sensor 21 is mounted. In the wafer support device of this embodiment, by adding the sinking amount read by the high-precision displacement sensor 22 to the value of the linear scale 17 mounted on the movable magnet 16a, it is possible to ascertain the position in the Z direction of the stage 1 relative to the fixed base 4 with more precision.

Figure 4:
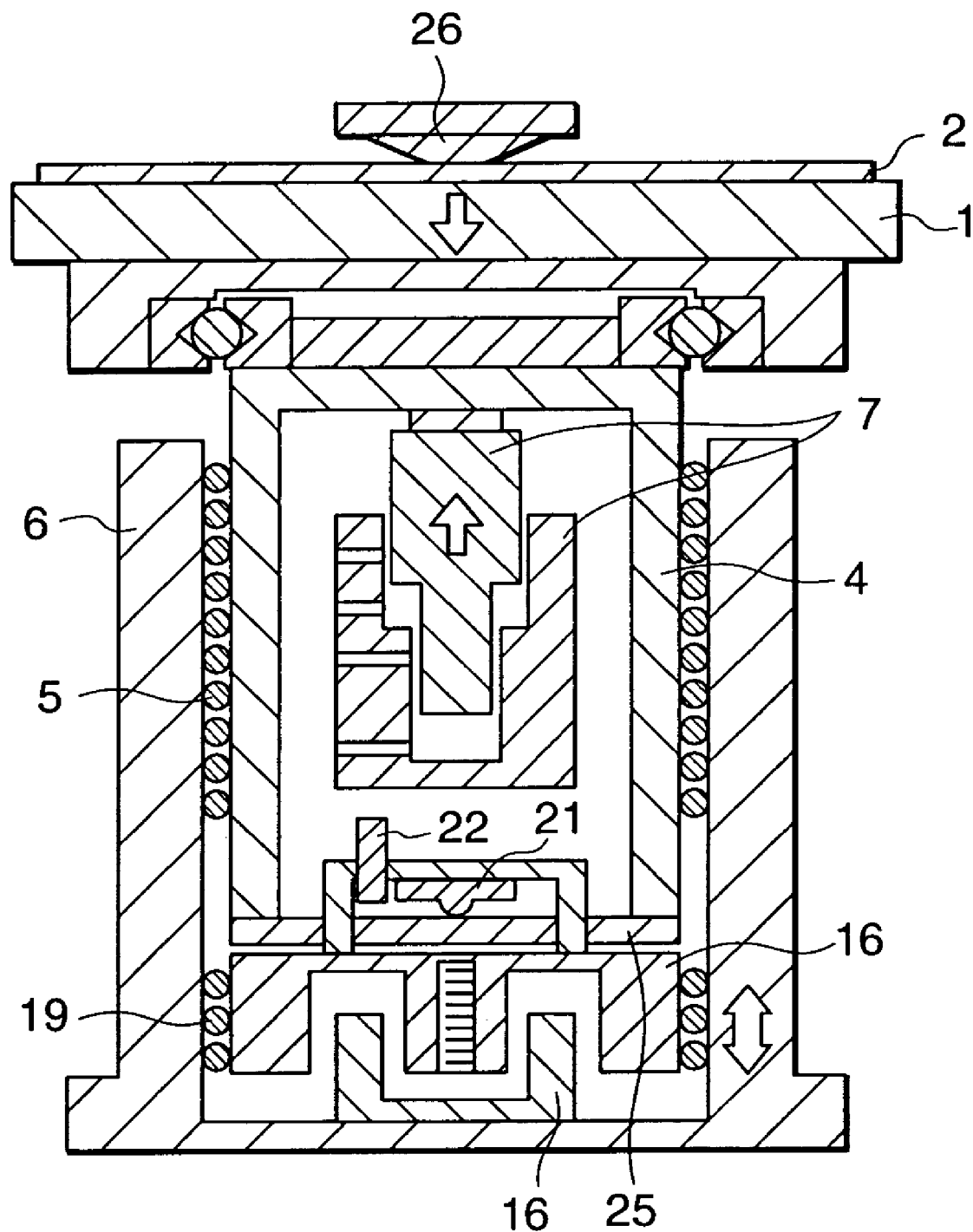
FIG. 4 is a cross sectional view for contact with a probe in the first embodiment of the present invention.

The operation of the first embodiment of the present invention will be now described. FIG. 4 is a cross sectional view in the case where a probe is in contact therewith in the first embodiment. As shown in FIG. 4, upon feeding a compressed air to the main pressurizing chamber 11 of the pressing member 7, an upward force is generated from the pressuring force onto the rod 7b. This pushes up the whole of the Z unit 24 in the upward direction. When the weight (Fz) of the Z unit 24 is 52 N, the apparent weight (Ft) of the Z unit is Ft=Fz−F1=0.5 N if the thrust (F1) of the main pressurizing chamber 11 is set at 51.5 N. Further, upon feeding a compressed air to the sub-pressurizing chamber 13 to make the thrust (F2) of the sub-pressurizing chamber 13 1 N, the result is that Ft=Fz−F1−F2=−0.5 N. Accordingly, the Z unit 24 moves upwards, so that the load sensor 21 is applied with an upward force of 0.5 N by the contact bar 25 for balancing. Herein, in the state where the probe 26 is not in contact therewith, Fs=Ft, where Fs denotes the force applied on the load sensor 21. In actuality, the force (Fp) of the probe 26 downwardly pressing the wafer is applied, so that Fs=Ft−Fp. For example, if the probe 26 comes in contact with the wafer 2, and the wafer 2 is downwardly pressed with a force of 0.7 N, Fs becomes −0.2 N, and accordingly, the Z unit 24 moves downwardly. In other words, if the value of Fp exceeds that of Ft, the Z unit 24 downwardly moves. In the foregoing example, a load of 0.5 N will not be applied on the probe 26. However, by setting the value of Ft to a proper value, it is possible to avoid the imposing of an excessive load on the probe 26. This load Ft is taken as a release load (Ft'). Further, the case where the Z unit 24 is vertically moved will be described. Upon driving the voice coil type linear motor 16, which is a driving source, with the release load (Ft') applied, the Z unit 24 moves vertically with respect to the contact between the load sensor 21 and the contact bar 25 in accordance with the movement of the movable magnet 16a. In this balanced state, the Z unit 24 vertically moves simultaneously with the movable magnet 16a via the load sensor 21. Therefore, the Fs detected by the load sensor 21 is, as shown in Expression 1, required to be a value larger than the sum of the sliding resistance (μf) of the cross roller guide 5, and the generated forces ($M\alpha_{max}$) during upward acceleration or downward deceleration whereby the generated force resulting from acceleration or deceleration is oriented upwards.

$$Fs > \mu f + M\alpha_{max} \qquad \text{EQUATION (1)}$$

(M: Z unit mass, $M\alpha_{max}$: accelerations during upward acceleration and downward acceleration)

For movement with a large acceleration, the pressure of the sub-pressurizing chamber 13 may be controlled by the precision electropneumatic regulator to increase Ft. Whereas, for contact detection, probing operation, or the like, Ft may be set small with a small acceleration. Alternatively, after the start of the operation, the operation shifts to a constant-speed movement, and then, the pressure of the sub-pressurizing chamber 13 may be reduced to decrease Ft. However, the speed for the contact detection or the probing operation may be as small as 0.1 to 100 μm/sec, and hence it presents no problem. Thus, in this embodiment, the self weight can be cancelled, and hence the weight of the movable member can be relatively increased. Further, in this embodiment, it is possible to reduce the rolling resistance (μf) by increasing the size of the cross roller guide 5 itself, and increasing the included roller diameter.

Further, in this embodiment, the fluctuations in load due to acceleration and deceleration affect the release load (Ft'). However, if under a constant-speed or stop state, fluctuations in load of the load sensor will not occur. For example, when the position at which the wafer 2 comes in contact with the probe 26 is intended to be detected, it is possible to perform the contact detection by moving the Z unit 24 upwardly at a constant speed, and monitoring the amount of change of the load sensor. In this case, the detection is slightly affected by the rolling resistance (μf), and hence a fluctuation in load of about 20 to 50 mN occurs even during constant-speed movement. However, any detection of about 80 mN is possible. Further, in this embodiment, it is possible to check in real time the state where the probe 26 comes in contact with the wafer 2, and the reactive force of the probe 26 increases, while moving the Z unit 24 at a constant speed. The fact that it is possible to avoid excessive load on the probe 26 by setting the release load (Ft') in accordance with the specifications of the probe 26 was described above. However, in such a case, in order to ascertain the position in the Z direction of the Z unit 24, the measurement of the distance between the load sensor and the contact bar 25 is carried out by means of the high-precision displacement sensor 22. Still further, in this embodiment, the supply pressure to the sub-pressurizing chamber 13 of the pressing member 7 is controlled by means of the precision electropneumatic regulator. Therefore, it is possible to change the supply pressure in accordance with the previously set probing profile, which allows the release load (Ft') corresponding to the situation to be set.

(Second Embodiment)

Figure 5:
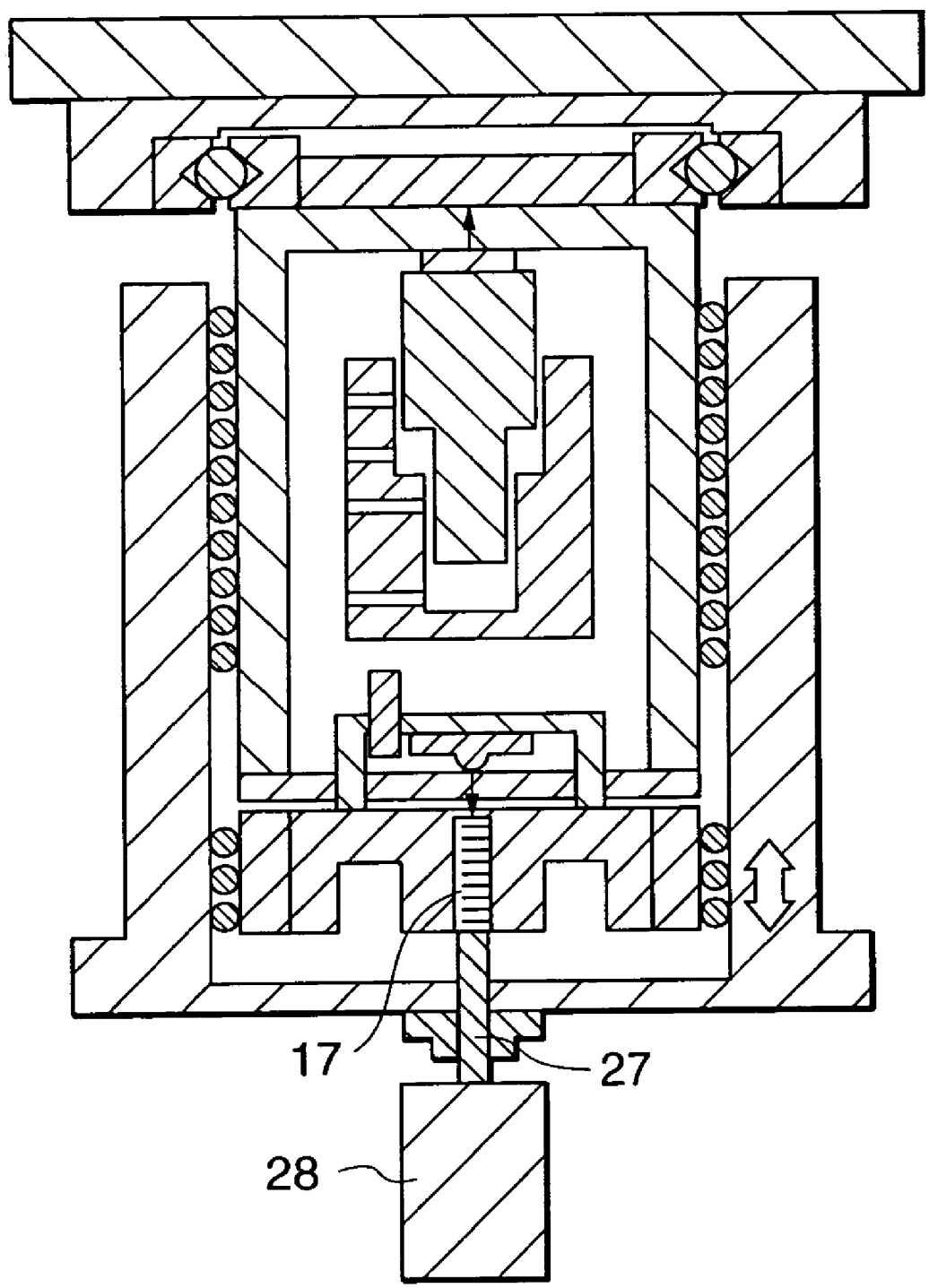
FIG. 5 is a cross sectional view of a second embodiment of the present invention.
Figure 6:
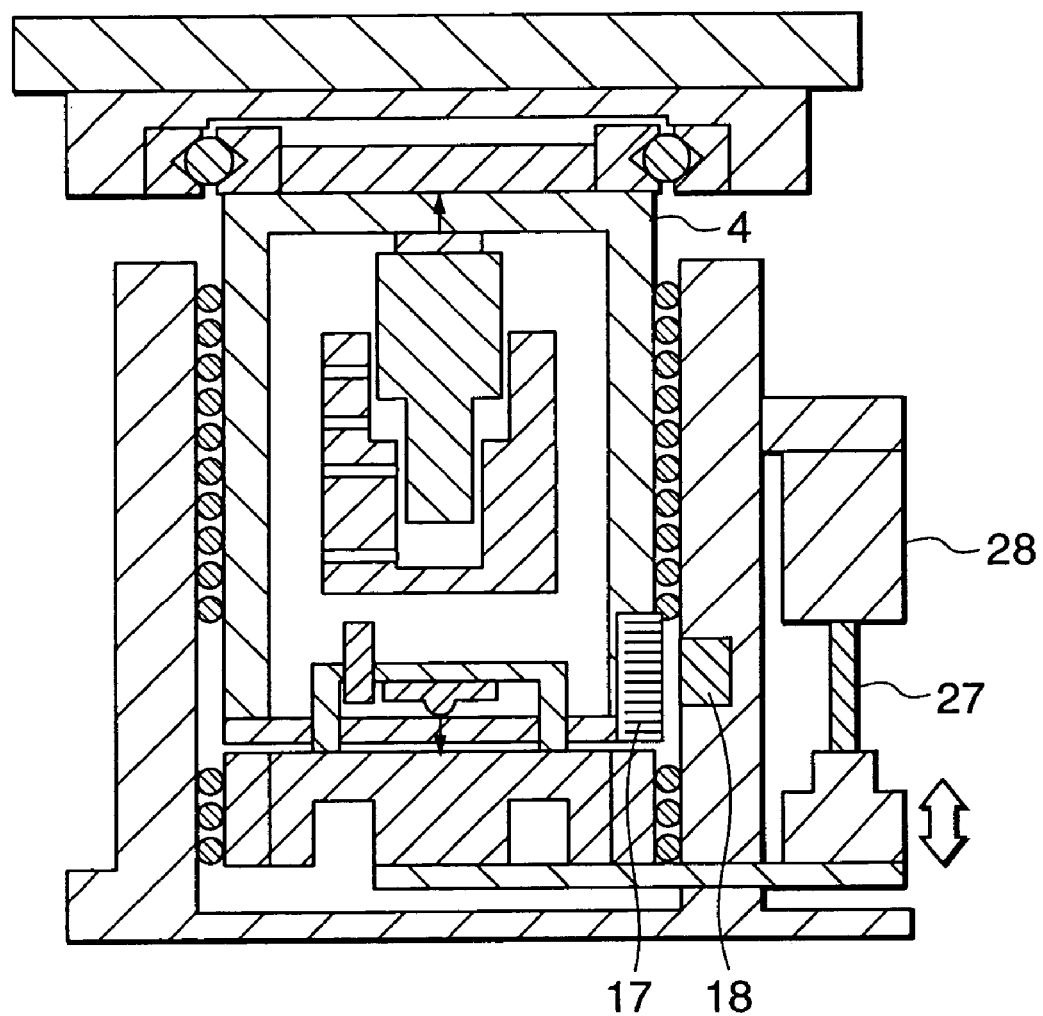
FIG. 6 is a cross sectional view of the second embodiment of the present invention.

Cross sectional views of a second embodiment of the present invention are shown in FIGS. 5 and 6. The second embodiment of the present invention is different from the first embodiment in that a ball screw 27 and a rotary motor 28 are used for a driving source instead of the linear motor as shown in FIG. 4. In this embodiment, the ball screw 27 is used, and hence it is effective as a means for avoiding the servo breakage upon sharp load fluctuation which presents a problem in use of the linear motor. When a servo motor is used for the rotary motor 28, it is possible to perform servo control by means of a rotary encoder. Whereas, when a pulse motor is used for the rotary motor 28, it is possible to simplify the mechanism configuration by performing open control. In this case, the lead error of the ball screw 27 affects the positioning precision of the Z axis, and hence it requires attention. Under such circumstances, as shown in FIG. 6, the linear scale 17 is mounted at the movable base 4, and further, the scale reading head 18 is mounted at the fixed base 6. Thus, by monitoring the absolute position, it is possible to ensure the positional precision in the Z direction of the stage.

As described in detail above, in accordance with the first embodiment of the present invention, it is possible to perform small load detection and control while ensuring the high-precision positioning precision on each point of a large-diameter wafer, and to further suppress the damage due to overload of a probe.

(Third Embodiment)

Figure 7:
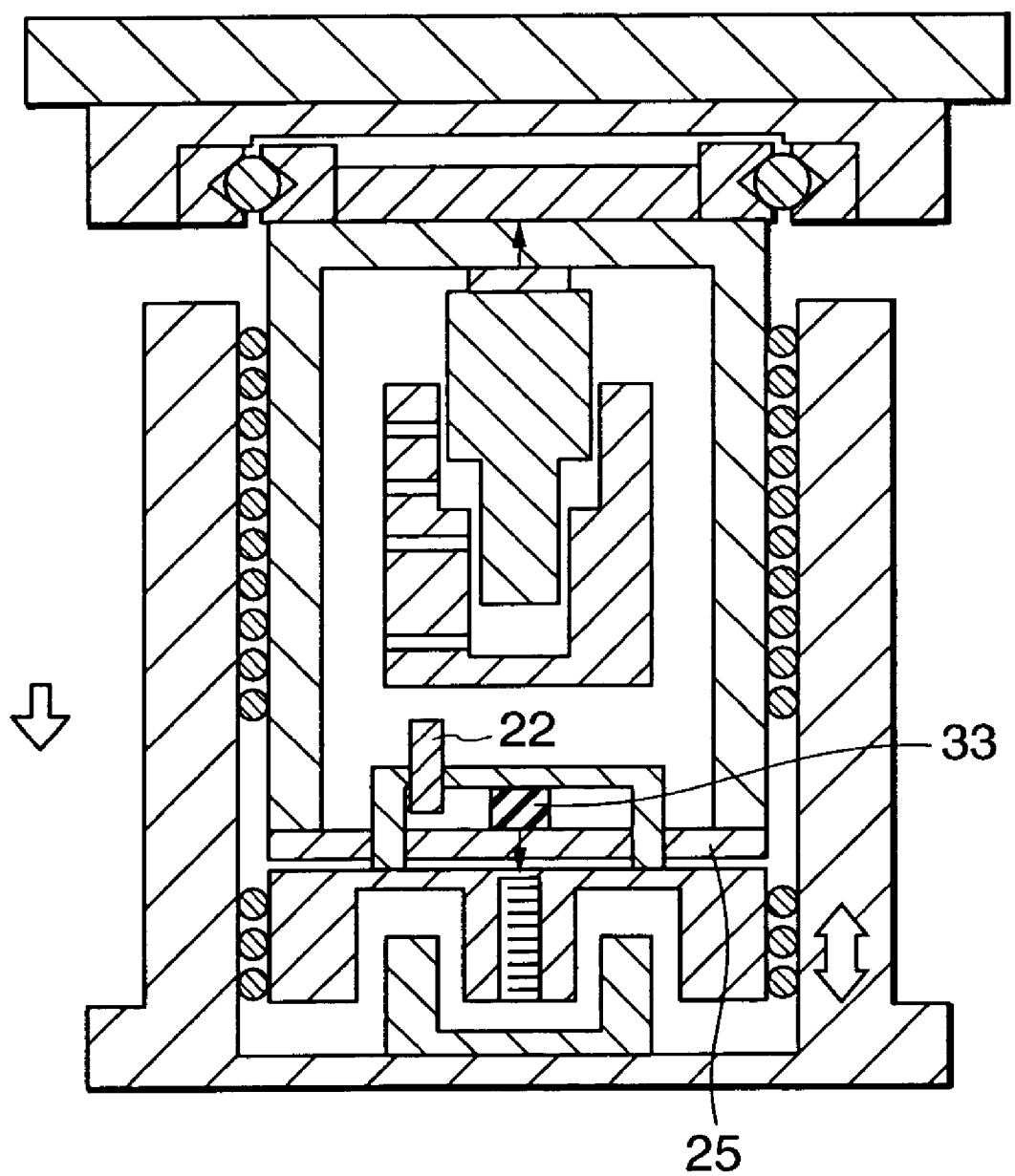
FIG. 7 is a cross sectional view of a third embodiment of the present invention.

A cross sectional view of a third embodiment of the present invention is shown in FIG. 7. In he third embodiment of the present invention, as shown in FIG. 7, the load control by the load sensor is replaced with the pressure control of the precision electropneumatic regulator by setting the release load (Ft') small without using a load sensor. For example, in the case where the release load (Ft') is 1 N, when the probe 26 comes in contact with the wafer 2, and the reactive force of the probe 26 infinitely approaches 1 N, the contact bar 25 is going to separate from a contact member 33. This is detected by the high-precision displacement sensor 22 to slightly increase the thrust (F2) of the sub-pressurizing chamber 13 by the precision electropneumatic regulator. As a result, the contact is kept. The contact member 33 of this embodiment is an elastic product, which allows the pressure control before the contact bar 25 completely separates.

(Fourth Embodiment)

Figure 8:
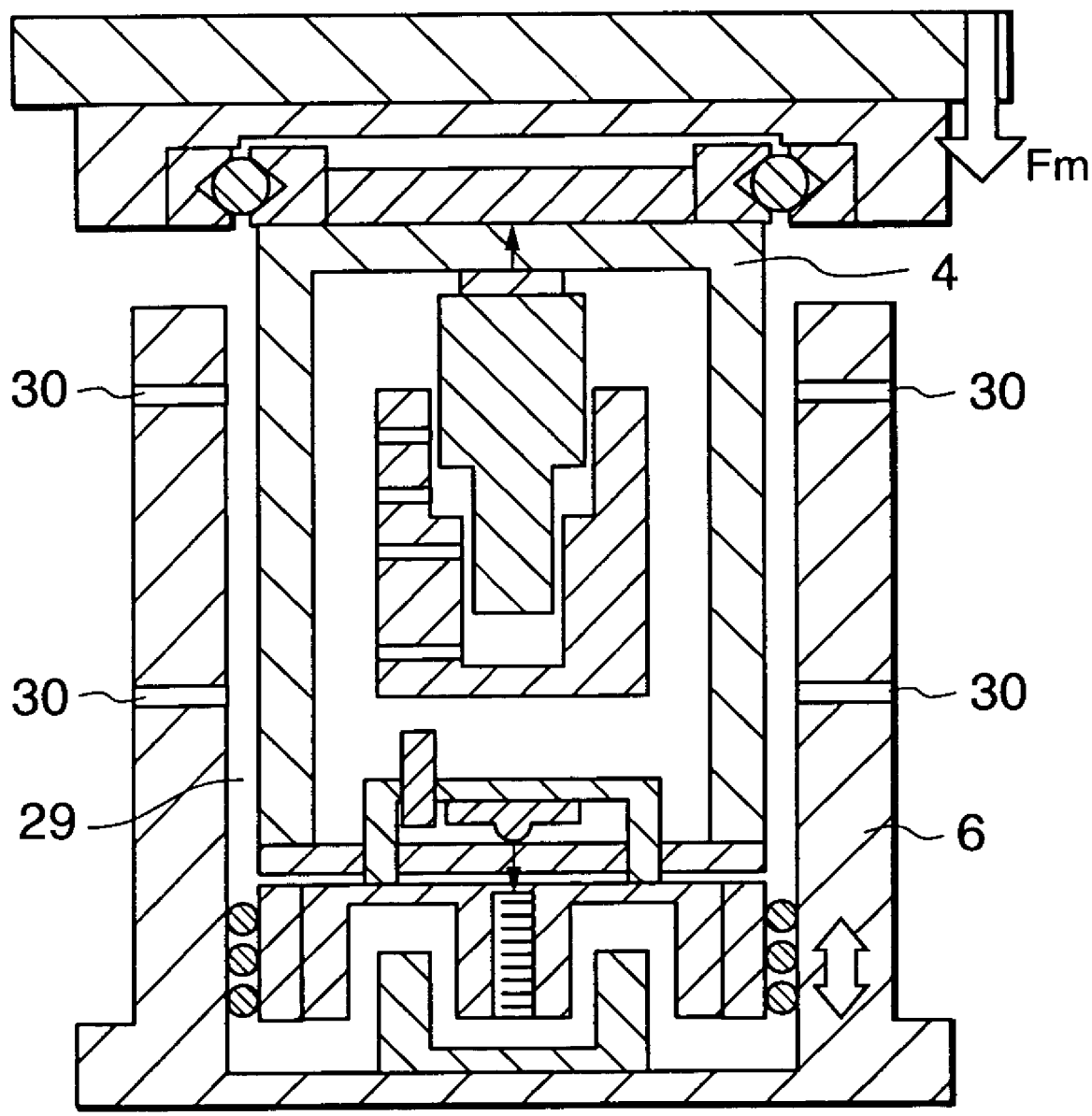
FIG. 8 is a cross sectional view of a fourth embodiment of the present invention.

A cross sectional view of a fourth embodiment of the present invention is shown in FIG. 8. In the fourth embodiment of the present invention, an air bearing 29 is used in place of the cross roller guide 5, and in particular, effective for use in a low load area. In this embodiment, by feeding a compressed air from a compressed air inlet 30 disposed on the fixed base 6, the movable base 4 is vertically guided. In this case, the mechanical rigidity with respect to the moment load (Fm) on the adsorption stage 1 is reduced, so that the positional deviation under eccentric load presents a problem. However, even in the case where the moment load (Fm) is not applied, or falls within a negligible range, namely, a load is applied on the center of the air bearing 29, or applied on the wafer edge, effects are produced if the load is small. In accordance with this embodiment, it is possible to achieve the state in which the rolling resistance ($\mu f$) occurring at the cross roller guide 5 described in the first embodiment is close to 0. This allows the contact detection even with a load of 1 g or less.

(Fifth Embodiment)

Figure 9:
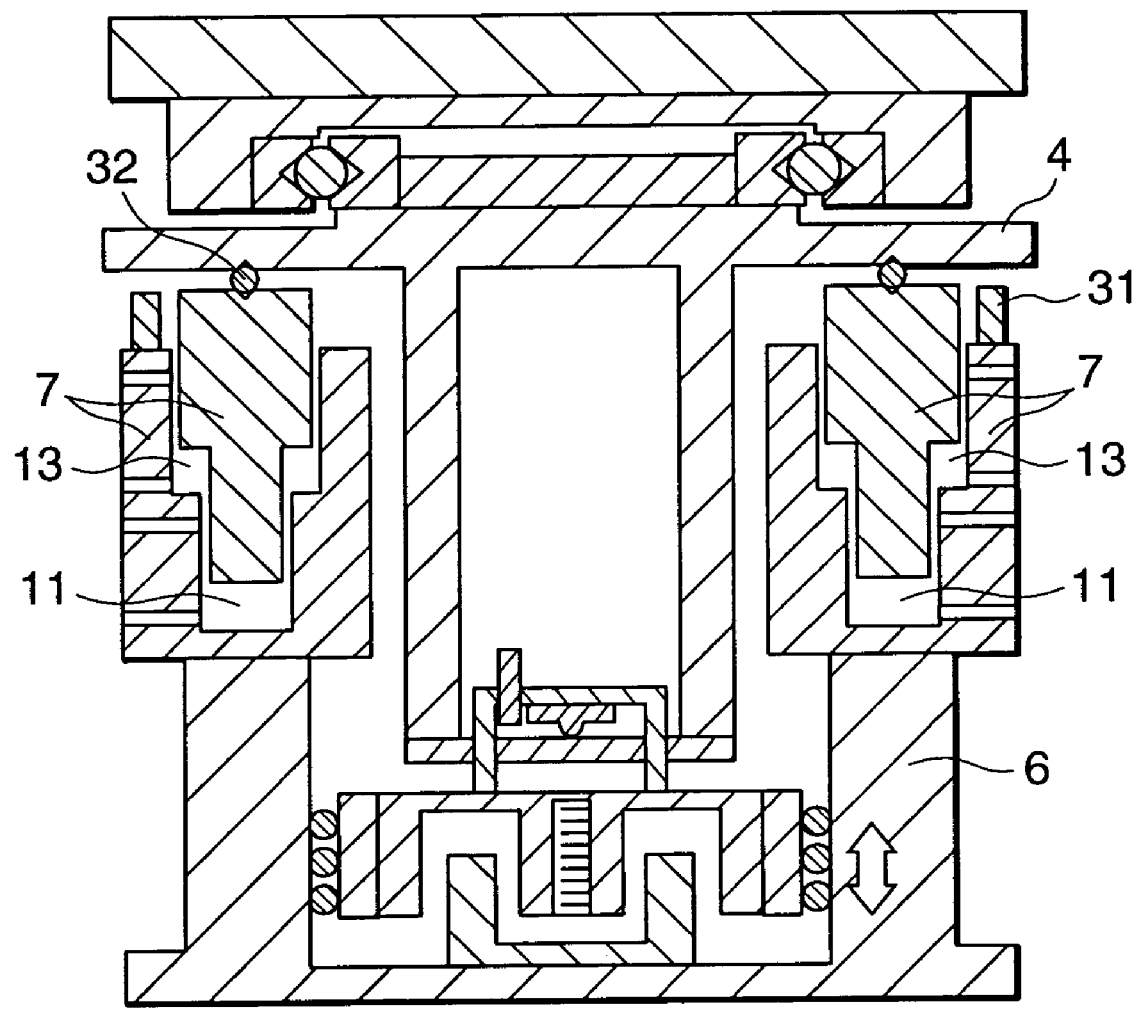
FIG. 9 is a cross sectional view of a fifth embodiment of the present invention.
Figure 10:
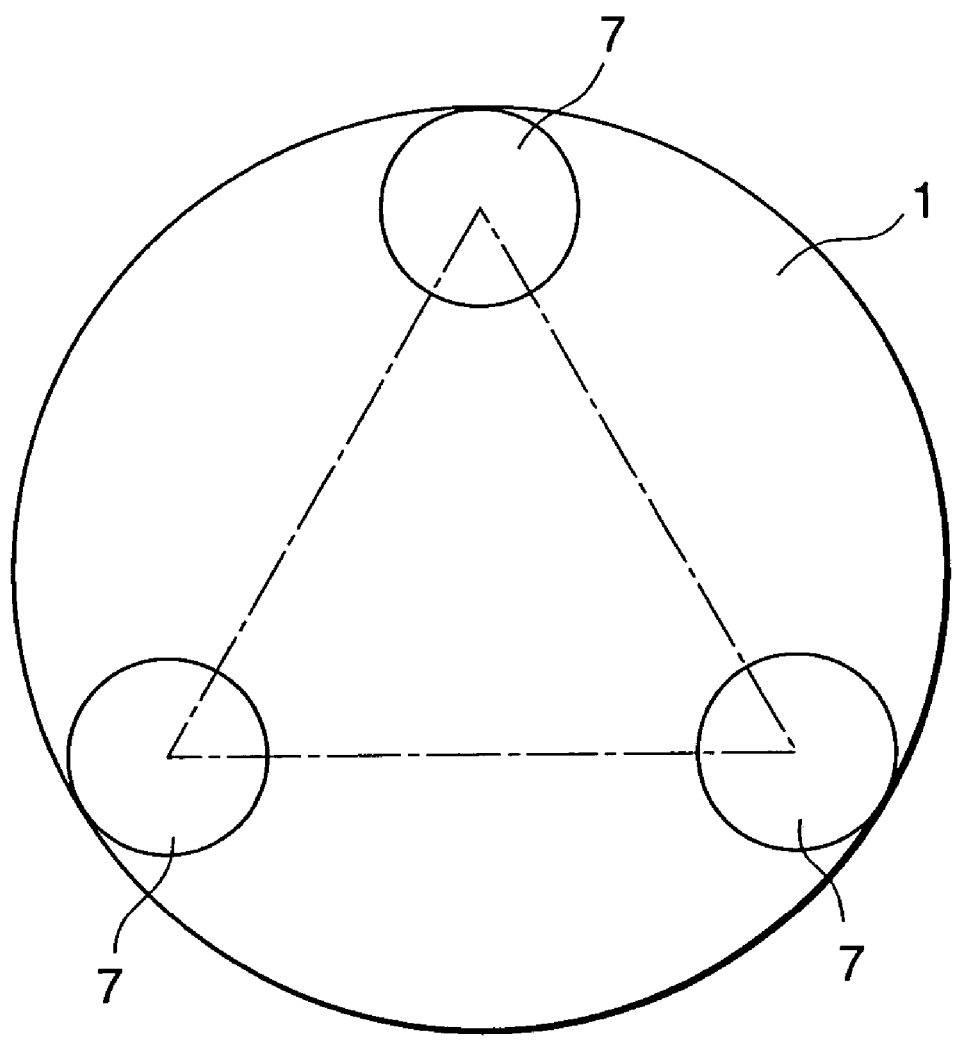
FIG. 10 is a top view of the fifth embodiment of the present invention.

FIG. 9 is a cross sectional view of a fifth embodiment of the present invention, and FIG. 10 is a top view thereof. In the fifth embodiment of the present invention, the cross roller guide 5 and the air bearing 29 are not used, but 3 sets of the pressing members 7 are used. Further, in this embodiment, the pressing members 7 also serve as guides for vertical movement. In this embodiment, the pressure of the main pressurizing chamber 11 is ensured from the same pressure regulator such as a precision regulator, so that the whole is balanced. Thus, the pressure of the sub-pressurizing chamber 13 is independently supplied to perform an independent control on the eccentric load on the periphery or the like. This can prevent the prying under moment load characteristic of the air bearing. Specifically, a high-precision displacement sensor 31 is attached beside the outside of each rod of the pressing members 7 to measure the distance from the movable base 4 in real time. Further, in this embodiment, the contact portion is formed by a ball joint 32. Therefore, the rod will not be pried under eccentric load. Thus, it is possible to ensure the length three times larger than normal as the length along the longitudinal direction effective for the moment load resistance required as an element for ensuring the rigidity of the air bearing.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

What is claimed is:

1. A wafer support device comprising:
a fixed base;
a guiding device on said fixed base;
a movable base disposed so as to move in a vertical direction with respect to the fixed base by said guiding device;
a first pressing device fixed on the fixed base, said first pressing device pressing said movable base;
a θ stage rotatably disposed on said movable base with the vertical direction as a rotation axis;
a linear motor fixed on said fixed base;
a contact bar disposed on said movable base;
a load control device controlling a load of pressing; and
a controller controlling a pressing force by said first pressing device based on said load detected by a load sensor, wherein said first pressing device has a cylinder which is fixed on said fixed base and has a main pressurizing chamber and a sub-pressurizing chamber, a piston rod vertically moving in the main pressurizing chamber and the sub-pressurizing chamber, respectively, a main pressure controller controlling a pressure in said main pressurizing chamber, and a sub pressure controller controlling a pressure in said sub-pressurizing chamber.

2. The wafer support device according to claim 1, further comprising an adsorption stage disposed on said θ stage, said adsorption stage fixing a wafer.

3. The wafer support device according to claim 1, wherein said load control device comprises said load sensor disposed on said linear motor, said load sensor detecting a load of pressing by said contact bar when said contact bar contacts said movable base.

4. The wafer support device according to claim 1, wherein said guiding device comprises a first cross roller guide.

5. The wafer support device according to claim 3, further comprising
a sensor base which said load sensor is mounted on,
a second cross roller guide guiding said sensor base in a vertical direction with respect to said fixed base,
a position sensor fixed on said fixed base, said position sensor detecting a vertical position of said sensor base, and
a driving member which said sensor base is mounted on, said driving member driving said sensor base in the vertical direction and controlling a vertical position of said load sensor.

6. The wafer support device according to claim 5, wherein said driving member has a fixed coil fixed on the fixed base, and a movable magnet to be floated by a magnetic action with said fixed coil.

7. The wafer support device according to claim 5, wherein said driving member has a motor fixed on said fixed base and a ball screw disposed on a driving axis of said motor, wherein said sensor base is vertically driven by reciprocally rotating said ball screw.

8. The wafer support device according to claim 5, wherein said guiding device comprises an air bearing.

9. The wafer support device according to claim 5, wherein said guiding device comprises a plurality of second pressing devices.

10. A wafer support method comprising:
providing a movable base having a stage loading a wafer;
providing compressed air into a main pressurizing chamber or a sub-pressurizing chamber and moving said main pressurizing chamber and said sub-pressurizing chamber independently;
moving said movable base by said compressed air in said main pressurizing chamber or said sub-pressurizing chamber;
moving said movable base by cross roller guide on a fixed base;
detecting a position of said movable base; and
controlling said position of said movable base according to said position detected.

11. The wafer support method according to claim 10, wherein said step of moving said movable base comprises driving said movable base by a linear motor.

12. The wafer support method according to claim 10, wherein said step of moving said movable base comprises driving said movable base by a rotary motor.

13. The wafer support method according to claim 10, further comprising controlling an amount of said compressed air into said main pressurizing chamber or said sub-pressurizing chamber.

14. A wafer support device comprising:
a fixed base;
a guiding device on said fixed base;
a movable base disposed so as to move in a vertical direction with respect to the fixed base by said guiding device;
a first pressing device fixed on the fixed base, said first pressing device pressing said movable base;
a θ stage rotatably disposed on said movable base with the vertical direction as a rotation axis;
a linear motor fixed on said fixed base;
a contact bar disposed on said movable base;
a load control device controlling a load of pressing; and
a controller controlling a pressing force by said first pressing device based on said load,
wherein said first pressing device has a cylinder which is fixed on said fixed base and has a main pressurizing chamber and a sub-pressurizing chamber, a piston rod vertically moving in the main pressurizing chamber and the sub-pressurizing chamber, respectively, a main pressure controller controlling a pressure in said main pressurizing chamber, and a sub pressure controller controlling a pressure in said sub-pressurizing chamber.

15. The wafer support device according to claim 14, wherein said load control device comprises a load sensor disposed on said linear motor, said load sensor detecting a load of pressing by said contact bar when said contact bar contacts said movable base.

16. The wafer support device according to claim 14, further comprising:
a sensor base on which a load sensor is mounted on,
a second cross roller guide guiding said sensor base in a vertical direction with respect to said fixed base,
a position sensor fixed on said fixed base, said position sensor detecting a vertical position of said sensor base, and
a driving member which said sensor base is mounted on, said driving member driving said sensor base in the vertical direction and controlling a vertical position of said load sensor.

17. The wafer support device according to claim 14, wherein said load of pressing is detected by a load sensor, and wherein said load sensor restricts said contact bar to moving upward and allows said contact bar to move downward when said contact bar contacts said load sensor.

18. A wafer support device comprising:
a fixed base;
a movable base disposed so as to move in a vertical direction with respect to the fixed base;
a pressing device fixed on the fixed base, said pressing device pressing the movable base;
wherein the pressing device comprises a cylinder which is fixed on the fixed base and has a main pressurizing chamber and a sub-pressurizing chamber, a piston rod which has a first part and a second part vertically moving in the main pressurizing chamber and the sub-pressurizing chamber, respectively, a main pressure controller controlling a pressure in the main pressurizing chamber, and a sub pressure controller controlling a pressure in the sub-pressurizing chamber, and
wherein said main pressurizing chamber and said sub-pressurizing chamber are moved independently by controlling said pressure in said main pressurizing chamber and said sub-pressurizing chamber.

19. The wafer support device according to claim 18, further comprising a detector which detects a position of the movable base and a controller which controls the pressing device.

20. The wafer support device according to claim 18, further comprising a contact detection device which detects contact between a probe and the movable base or a wafer on the movable base.

21. The wafer support device according to claim 18, further comprising a sensor base so as to move in a vertical direction with respect to the fixed base, a position sensor which detects a vertical position of the sensor base, and a driving device which drives the sensor base in the vertical direction.

22. The wafer support device according to claim 18, further comprising a guiding device which guides the movable device to move in a vertical direction with respect to the fixed base.

23. The wafer support device according to claim 18, further comprising a plurality of pressing devices.

24. The wafer support device according to claim 21, wherein the driving device comprises a ball screw and a rotary motor.

25. A wafer support method comprising:
providing a wafer on a movable base;
providing compressed air into a main pressurizing chamber and a sub-pressurizing chamber and moving said main pressurizing chamber and said sub-pressurizing chamber independently; and
moving the movable base by the compressed air in the main pressurizing chamber and the sub-pressurizing chamber.

26. The wafer support method according to claim 25, further comprising detecting a position of the movable base; and
controlling the position of the movable base according to the position detected.

27. The wafer support method according to claim 25, further comprising detecting a position of a sensor base with respect to the movable base; and
controlling the position of the sensor base according to the detected position of the sensor base with respect to the movable base.

28. A wafer support device comprising:
a fixed base;
a guiding device on said fixed base;
a movable base disposed so as to move in a vertical direction with respect to the fixed base by said guiding device;
a first pressing device fixed on the fixed base, said first pressing device pressing said movable base;
a θ stage rotatably disposed on said movable base with the virtual direction as a rotation axis;
a contact bar disposed on said movable base;
a load control device controlling a load of pressing; and
a controller controlling a pressure force by said first pressing device based on said load,
wherein said first pressing device has a cylinder which is fixed on said fixed base and has a main pressurizing chamber and a sub-pressurizing chamber, a piston rod vertically moving in the main pressurizing chamber and the sub-pressurizing chamber, respectively, a main pressure controller controlling a pressure in said main pressurizing chamber, and a sub pressure controller controlling a pressure in said sub-pressurizing chamber.

* * * * *